US009353729B2

(12) United States Patent
Wilson et al.

(10) Patent No.: US 9,353,729 B2
(45) Date of Patent: May 31, 2016

(54) AERODYNAMIC HUB ASSEMBLY FOR A WIND TURBINE

(71) Applicant: General Electric Company, Schenectady, NY (US)

(72) Inventors: Ian David Wilson, Simpsonville, SC (US); Kevin Wayne Kinzie, Spartanburg, SC (US); James Henry Madge, Simpsonville, SC (US); Daniel Jason Erno, Clifton Park, NY (US); Michael Colan Moscinski, Glenville, NY (US); Zaeem Ashraf Khan, Albany, NY (US); Dmytro Floriyovych Opaits, Glenville, NY (US)

(73) Assignee: General Electric Company, Schenectady, NY (US)

( * ) Notice: Subject to any disclaimer, the term of this patent is extended or adjusted under 35 U.S.C. 154(b) by 427 days.

(21) Appl. No.: 13/933,565

(22) Filed: Jul. 2, 2013

(65) Prior Publication Data

US 2015/0010403 A1 Jan. 8, 2015

(51) Int. Cl.
*F03D 7/02* (2006.01)
*F03D 1/06* (2006.01)

(52) U.S. Cl.
CPC ............ *F03D 1/0691* (2013.01); *F03D 1/0658* (2013.01); *F03D 1/0675* (2013.01); *F03D 7/0224* (2013.01); *F03D 7/0228* (2013.01); *F05B 2240/302* (2013.01); *Y02B 10/30* (2013.01); *Y02E 10/721* (2013.01)

(58) Field of Classification Search
CPC ... F03D 1/0633; F03D 1/0641; F03D 1/0658; F03D 1/0675; F03D 1/0683; F03D 1/0691; F03D 7/0224; F03D 7/0228; F05B 2240/302
USPC ...... 416/147, 155, 205, 244 R, 244 A, 245 R, 416/245 A, 210 R, 210 A
See application file for complete search history.

(56) References Cited

U.S. PATENT DOCUMENTS

| | | | |
|---|---|---|---|
| 2,278,247 A * | 3/1942 | Cullin | F03D 1/0658 290/55 |
| 7,381,029 B2 | 6/2008 | Moroz | |
| 2009/0148285 A1 | 6/2009 | Scholte-Wassink | |
| 2009/0148291 A1 | 6/2009 | Gerber et al. | |
| 2011/0142645 A1 * | 6/2011 | Nunez Polo | F03D 1/0658 416/149 |
| 2012/0294723 A1 | 11/2012 | Grabau et al. | |

* cited by examiner

*Primary Examiner* — Christopher Verdier
(74) *Attorney, Agent, or Firm* — Dority & Manning, P.A.

(57) ABSTRACT

An aerodynamic hub assembly for a wind turbine is disclosed. The hub assembly may include a hub extension, a rotor blade having a blade root and a blade tip, and a hub airfoil section mounted at least partially over the hub extension. The hub airfoil section may be fixed relative to the rotor blade or may be configured to rotate about a common pitch axis with the rotor blade. The hub extension may be connected to and extend radially from a center of the hub assembly. Further, the hub assembly may include a pitch bearing having an inner race and an outer race, wherein the pitch bearing may be coupled between the hub extension and the blade root. Additionally, the hub assembly may also include an aerodynamically-shaped spinner, wherein the spinner may house at least a portion of a root structure extending radially from the center of the hub assembly.

17 Claims, 5 Drawing Sheets

AERODYNAMIC HUB ASSEMBLY FOR A WIND TURBINE

FIELD OF THE INVENTION

The present subject matter relates generally to wind turbines, and more particularly to an aerodynamic hub assembly for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub and one or more rotor blades. Each rotor blade is typically attached to the rotatable hub by a pitch bearing. The rotor blades capture kinetic energy from the wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length and surface area of the rotor blades. Increasing the rotor blade length, however, may increase loading on other components of the wind turbine. For example, loads experienced by the rotor blades are at a maximum at the pitch bearing. Thus, increasing the length of the rotor blade may require larger and more expensive pitch bearings. Further, transportation costs increase along with increases in rotor blade surface area and length.

As such, efforts have been made to increase energy output of the wind turbine without increasing the length of the rotor blades. For example, hub extensions installed between the hub and the rotor blade have been utilized; however, such extensions do not have an airfoil profile and do not increase energy output. Other wind turbines have utilized a hub airfoil section around the hub extension. Such a fairing may produce some power but does not pitch with the blade; therefore, at off-design wind speeds and directions these fairings produce very little power.

Accordingly, there is a need for a hub assembly for a wind turbine that increases energy output without increasing load on a pitch bearing and without increasing transportation costs. More specifically, a hub assembly for a wind turbine having improved aerodynamic properties would be desired in the art.

BRIEF DESCRIPTION OF THE INVENTION

Aspects and advantages of the invention will be set forth in part in the following description, or may be obvious from the description, or may be learned through practice of the invention.

In one aspect, an aerodynamic hub assembly for a wind turbine is disclosed. The hub assembly includes at least one hub extension, at least one rotor blade having a blade root and a blade tip, and at least one rotatable hub airfoil section mounted at least partially over the hub extension so as to provide improved aerodynamic properties to said hub extension. The rotatable hub airfoil section may be configured to rotate about a common pitch axis with the rotor blade. The hub extension may be connected to and extend radially from a center of the hub assembly. Further, the hub assembly may include a pitch bearing having an inner race and an outer race, wherein the pitch bearing may be coupled between the hub extension and the blade root. As such, the rotatable hub airfoil section may be coupled to the pitch bearing together with the blade root so as to rotate about a common pitch axis with the blade root.

Additionally, the hub extension may be coupled to the pitch bearing such that the hub extension remains fixed, whereas the rotatable hub airfoil section and the blade root rotate together about the pitch axis. In another embodiment, the hub assembly may further include a rotatable blade airfoil section mounted at least partially over the blade root, wherein the rotatable blade airfoil section is rotatable about the pitch axis. In still another embodiment, the rotatable hub airfoil section may extend radially outward so as to cover at least a portion of the blade root in addition to covering a portion of the hub extension.

In yet another embodiment, the hub assembly may include a fixed hub airfoil section, wherein the fixed hub airfoil section remains fixed relative to the blade root. Further, the hub airfoil section and the blade airfoil section may be substantially aerodynamically shaped.

In a further embodiment, the blade root and the hub airfoil section may be coupled to the inner race of the pitch bearing, whereas the hub extension may be coupled to the outer race of the pitch bearing. As such, the inner race may be configured to rotate about the pitch axis, while the outer race remains fixed. In another embodiment, the blade root and the hub airfoil section may be coupled to the outer race of the pitch bearing, whereas the hub extension is coupled to the inner race of the pitch bearing. As such, the outer race may be configured to rotate about the pitch axis, while the inner race remains fixed.

In further embodiments, the hub assembly may include an aerodynamically-shaped spinner housing a root structure extending radially from the center of the hub assembly. Further, the spinner may be configured to be coupled to a rotor of the wind turbine. As such, the rotatable hub airfoil section may extend substantially from the blade root to the aerodynamically-shaped spinner. In another embodiment, the spinner may be absent and the rotatable hub airfoil section may extend substantially from the blade root to the center of the hub assembly.

In another aspect of the invention, the hub assembly may include an aerodynamically-shaped spinner, at least one hub extension, a rotor blade, and a hub airfoil section. The spinner may house at least a portion of a root structure extending radially from a center of the hub assembly. The hub extension may extend radially from the spinner. The rotor blade may have a blade root and a blade tip. Further, the blade root may be coupled to the hub extension. Additionally, the hub assembly may include a rotatable blade airfoil section mounted at least partially over the blade root such that the rotatable blade airfoil section rotates about the common pitch axis. Moreover, the hub airfoil section may be mounted at least partially over the hub extension and may be fixed or configured to rotate about a common pitch axis with the rotor blade so as to provide improved aerodynamic properties to said hub extension. Such an embodiment may further include any of the features described herein.

Further aspects of the invention encompass a wind turbine having a tower; a nacelle mounted on the tower; a rotor coupled to the nacelle; and a hub assembly coupled to the rotor. The hub assembly includes a hub extension, a rotor blade having a blade root and a blade tip, and a rotatable hub airfoil section mounted at least partially over the hub extension so as to provide improved aerodynamic properties to said hub extension. The rotatable hub airfoil section may be configured to rotate about a common pitch axis with the rotor blade. The hub extension may be connected to and extend radially from a center of the hub assembly. Further, the hub assembly may include a pitch bearing coupled between the hub extension and the blade root. As such, the rotatable hub airfoil section may be coupled to the pitch bearing together with the blade root so as to rotate about a common pitch axis with the blade root.

In further embodiments, the hub assembly may include a plurality of rotor blades having a blade root and a blade tip, a plurality of hub extensions, and a plurality of rotatable hub airfoil sections. In other embodiments, each blade root may be coupled to one of the plurality of hub extensions, and one of the plurality of rotatable hub airfoil sections may be mounted at least partially around each hub extension. Additionally, it should be understood that the hub assembly coupled to the wind turbine may be configured in accordance with any one of the embodiments set forth above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an aerodynamic hub assembly that provides for an increase in energy production without increasing loading on a pitch bearing. For example, in several embodiments, the hub assembly may include a hub extension extending from a center of the hub assembly, a rotor blade having a blade root and a blade tip, and a rotatable hub airfoil section mounted at least partially over the hub extension, wherein the rotatable hub airfoil section may be configured to rotate about a common pitch axis with the rotor blade. As used herein, the term "airfoil section" is meant to encompass any aerodynamic cover for any wind turbine component. For example, in one embodiment, the airfoil section may be shaped to provide a low drag. Alternatively, the airfoil section may be shaped to increase power production. In still further embodiments, the airfoil section may be a fairing, a skirt, or similar. As such, the airfoil section may have any suitable shape and is not limited by the shapes specifically described herein.

Further, the hub assembly may include a pitch bearing coupled between the hub extension and the blade root (i.e. outboard from the hub). As such, the rotatable hub airfoil section may be coupled to the pitch bearing together with the blade root to allow for rotation of the rotatable hub airfoil section. Additionally, the outboard location of the pitch bearing may decrease loading acting on the pitch bearing because shorter rotor blades may be provided to achieve the same overall rotor blade length. Accordingly, the aerodynamic shape and rotation of the rotatable hub airfoil section along with the partial span location of the pitch bearing may increase energy production without increasing loading on the pitch bearing.

Additionally, the hub assembly described herein may include a plurality of sections that may be separately shipped. The multiple sections may be shipped in one container and/or manufactured on-site. For example, in one embodiment, the hub assembly may include a hub extension, a typically shorter rotor blade, a rotatable hub airfoil section, and a blade airfoil section. As such, transportation costs for shipping the smaller multiple sections may be less expensive than costs associated with shipping previous larger sections.

Figure 1:
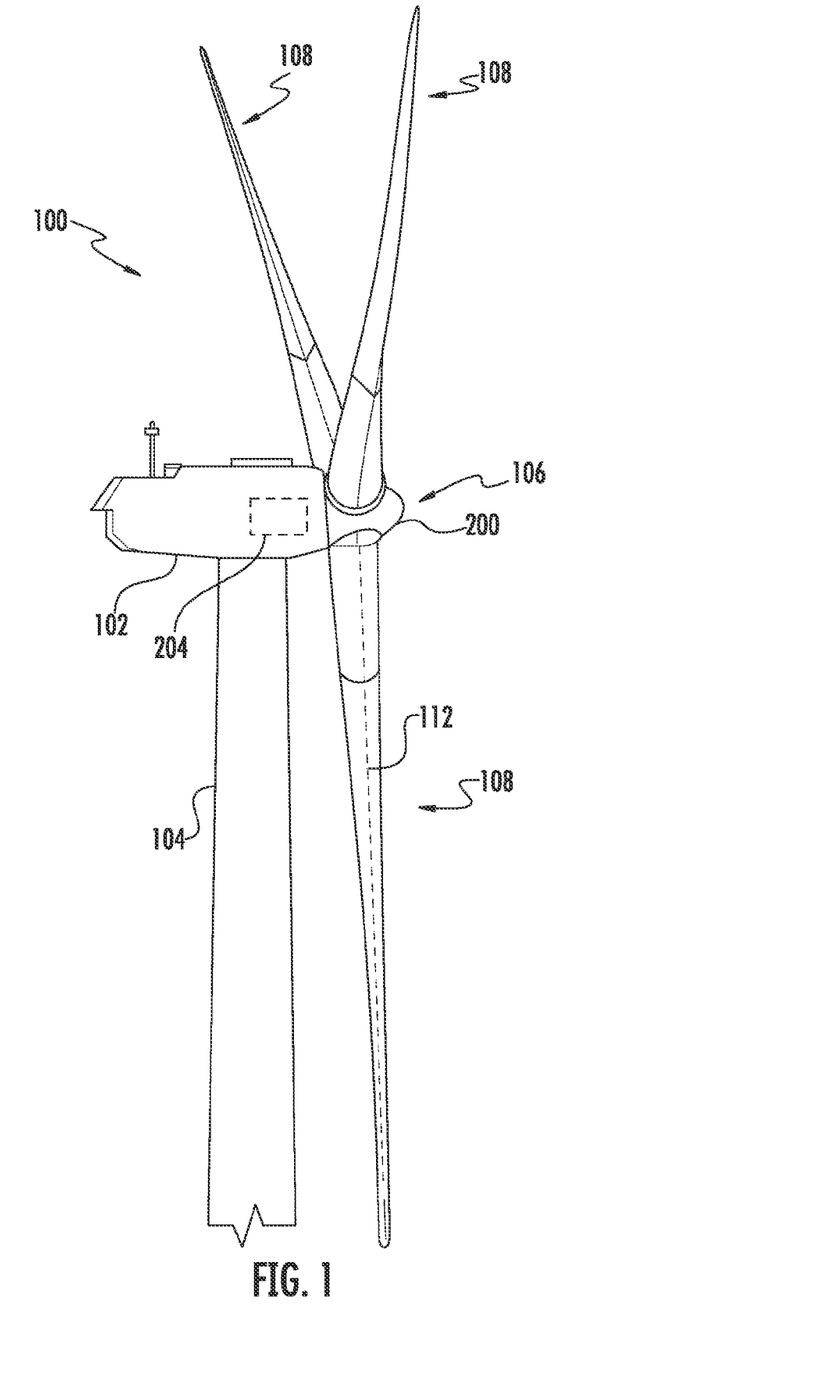
FIG. 1 illustrates a perspective view of a wind turbine according to the present invention.

Referring to the drawings, FIG. 1 illustrates a perspective view of one embodiment of a wind turbine 100 according to the present disclosure. As shown, the wind turbine 100 includes a tower 104, a nacelle 102 mounted on the tower 104, and a rotor 106 coupled to the nacelle 102. The rotor 106 includes a hub assembly 200 having at least one rotor blade 108 coupled to and extending outwardly from the hub assembly 200. For example, in the illustrated embodiment, the hub assembly 200 includes three rotor blades 108. However, in an alternative embodiment, the hub assembly 200 may include more or less than three rotor blades 108.

Each rotor blade 108 may be spaced about the hub assembly 200 to facilitate rotating the rotor 106 to enable kinetic energy to be transferred from the wind into usable mechanical energy, and subsequently, electrical energy. For instance, hub assembly 200 is rotatably coupled to an electrical generator within the nacelle 102 for production of electrical energy. Each blade 108 may also rotate about a respective pitch axis 112, which is substantially parallel to the span of each rotor blade 108.

Figure 2:
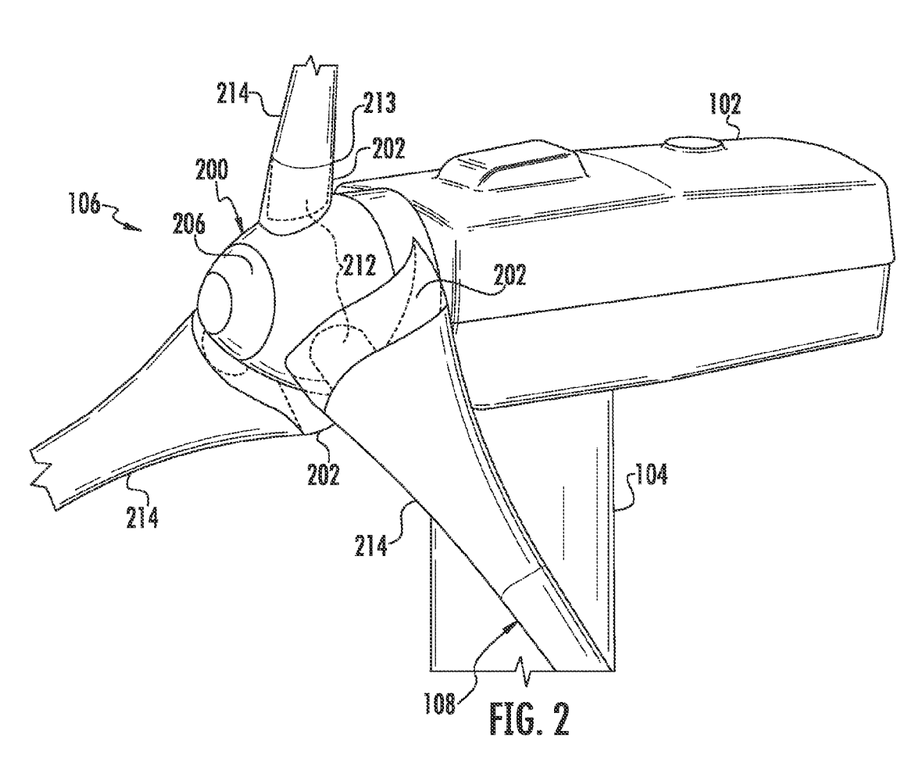
FIG. 2 illustrates a perspective view of a hub assembly coupled to a nacelle according to the present invention.

Referring now to FIG. 2, a perspective view of a hub assembly 200 is illustrated. The depicted embodiment includes hub assembly 200 having three rotor blades 108 coupled to and extending from a respective hub extension 212. Further, hub extensions 212 may be each covered by a rotatable hub airfoil section 202 so as to provide improved aerodynamic properties. More specifically, rotor blades 108 and rotatable hub airfoil sections 202 may be coupled to hub extensions 212 by a pitch bearing (not shown) located at an interface 213. Positioning the pitch bearing at interface 213 (i.e. at a partial space location of the rotor blade) provides less loading on the pitch bearing, while also maximizing effective rotor blade length.

Figure 3:
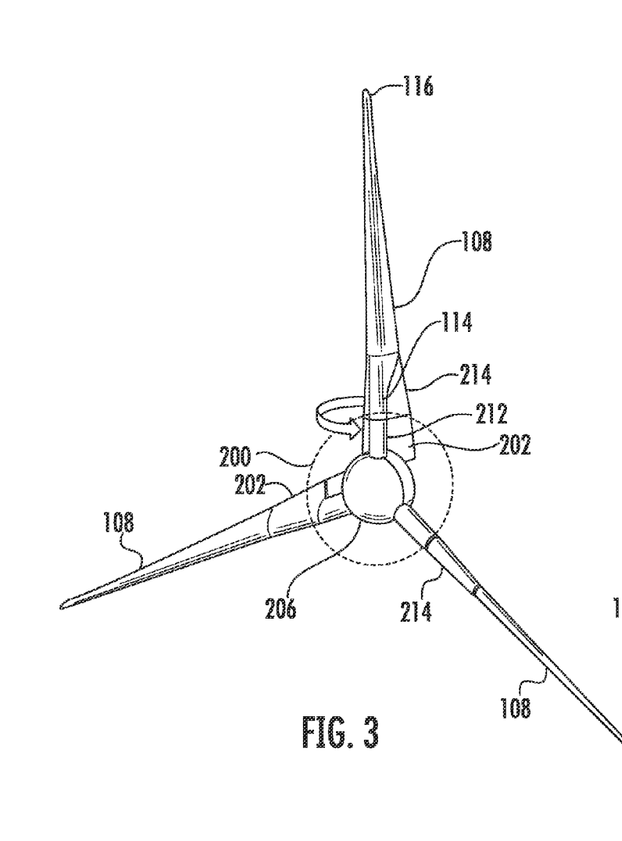
FIG. 3 illustrates an external view of a hub assembly according to the present invention.
Figure 4:
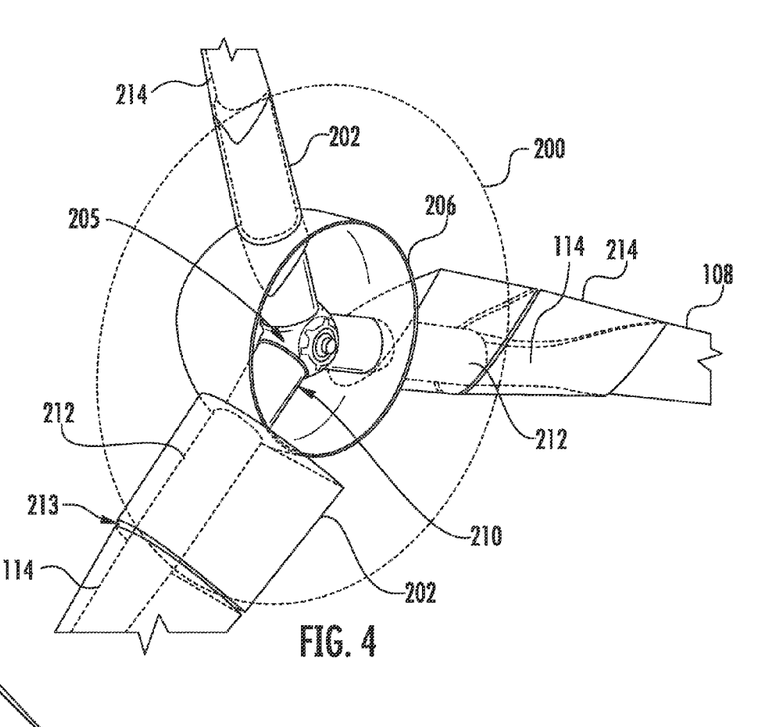
FIG. 4 illustrates an internal view of a hub assembly according to the present invention.

In further embodiments, hub assembly 200 may also include one or more blade airfoil sections 214 mounted at least partially over a blade root 114 (FIGS. 3 and 4). The blade airfoil section 214 may provide better aerodynamic properties than the cylindrical blade root 114 alone, much like the rotatable hub airfoil sections 202. Further, blade airfoil sections 214 may rotate with the blade root 114 or may remain fixed. As such, blade airfoil sections 214 may be configured to modify the aerodynamic properties of the blade 108.

Referring now to FIGS. 3 and 4, a more detailed external and internal view of hub assembly 200 according to one embodiment of the present disclosure is illustrated. More specifically, hub assembly 200 (as indicated by the dotted lines) is detached from nacelle 102 to provide an external (FIG. 3) and internal (FIG. 4) view. As illustrated, hub assembly 200 may include hub extensions 212, hub airfoil sections 202, blade airfoil sections 214, and a spinner 206 which houses a root structure 210.

As illustrated, spinner 206 is an aerodynamic cover for the hub assembly 200 and generally extends between the rotor blades 108. Further, spinner 206 may cover root structure 210 in its entirety or may cover only a portion of root structure 210. As such, hub extensions 212 may extend outside of spinner 206. Generally, hub extensions 212 extend radially from a center 205 of hub assembly 200 and may be coupled to or may be extensions of root structure 210. For example, as illustrated, hub extensions 212 are coupled to or may be extensions of root structure 210 and may extend radially from spinner 206, wherein the spinner 206 may be coupled to the rotor 106 (not shown). In various embodiments, hub extensions 212 may be formed as an integral part of root structure 210 or may be separate components coupled to root structure 210. It should also be understood that the hub extensions 212 may be cylindrically shaped (as shown), or may be any other shape known in the art.

Still referring to FIGS. 3 and 4, the hub airfoil sections 202 may be mounted at least partially over the hub extensions 212 so as to provide increased aerodynamic properties to the hub extensions 212. In another embodiment, the hub airfoil sections 202 may also extend radially outward to cover a portion of the hub extensions 212 and at least a portion of the blade root 114. Further, the hub airfoil sections 202 may be fixed relative to the rotor blade 108 or may be configured to rotate about a common pitch axis with the rotor blade 108, as discussed in reference to FIGS. 5 and 6. Similarly, the blade airfoil sections 214 may be mounted at least partially over the blade root 114 and may be fixed relative to the rotor blade 108 or configured to rotate about a common pitch axis with the rotor blade 108. Generally, the term "hub airfoil section" as used herein describes an airfoil section that at least partially covers a hub extension; whereas the term "blade airfoil section" as used herein describes an airfoil section that at least partially cover a blade root. These terms, however, are not meant to be limiting, and it should be understood that a hub airfoil section may extend to partially cover a blade root and similarly, a blade airfoil section may extend to partially cover a hub extension.

When hub airfoil sections 202 are mounted over hub extensions 212, they are configured provide an improved aerodynamic shape to the hub assembly 200. Such a configuration may provide more power generation from the rotor blades 108. As such, the potential energy production of the wind turbine 100 may be increased. Further, hub airfoil sections 202 may be coupled between spinner 206 and rotor blade 108. In another embodiment, spinner 206 may be omitted altogether such that hub airfoil sections 202 are coupled between the center 205 of hub assembly 200 and rotor blade 108.

In still further embodiments, the airfoil sections 202, 214 described herein may include airflow modifying elements, such as, for example, spoilers, vortex generators, air fences, or similar. Further, the airfoil sections 202, 214 as described herein may include any airflow modifying elements known in the art for rotor blades.

It should be understood that hub extensions 212, root structure 210, and spinner 206 may be fabricated of any suitable material including, but not limited to aluminum, metal alloys, glass composites, carbon composites or carbon fiber. Moreover, hub extensions 212 may be one of or any combination of cylindrical, oval, conical, truss-beam structure or frusto-conical in shape. Spinner 206 may be designed to have an aerodynamic shape having a diameter that ranges from about 5% to about 20% of the diameter of the rotor 106. In another embodiment, spinner 206 may be eliminated entirely to reduce costs. In such a configuration, hub airfoil sections 202 may be extended close to the rotational axis of rotor 106 (i.e. the center 205 of the hub assembly 200).

In another embodiment, hub extensions 212 may be from about 20% to about 50% of the length of the assembled rotor blade 108. As such, the manufactured rotor blade 108 may shortened by about 50% to about 80% of its desired length. As such, a smaller and less expensive pitch bearing may be employed at interface 213 and transportation costs may be decreased. It should also be appreciated that, in several embodiments, hub extension 212 may be designed to have a substantially similar shape and/or configuration as blade root 114. For example, hub extension 212 may define a substantially cylindrical shape and may be configured as a relatively rigid member so as to be capable of withstanding the bending moments and other forces generated during operation of wind turbine 100.

Figure 5:
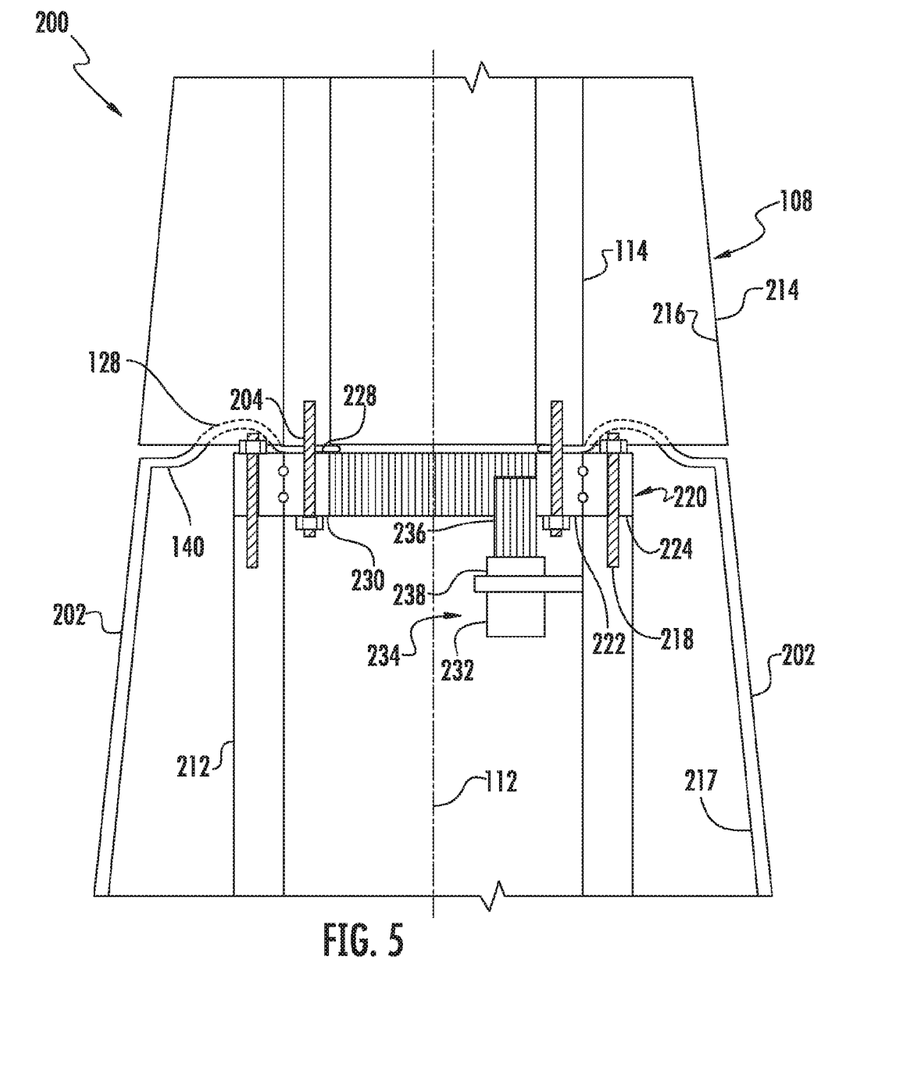
FIG. 5 illustrates a cross-sectional view of a hub assembly according to the present invention.
Figure 6:
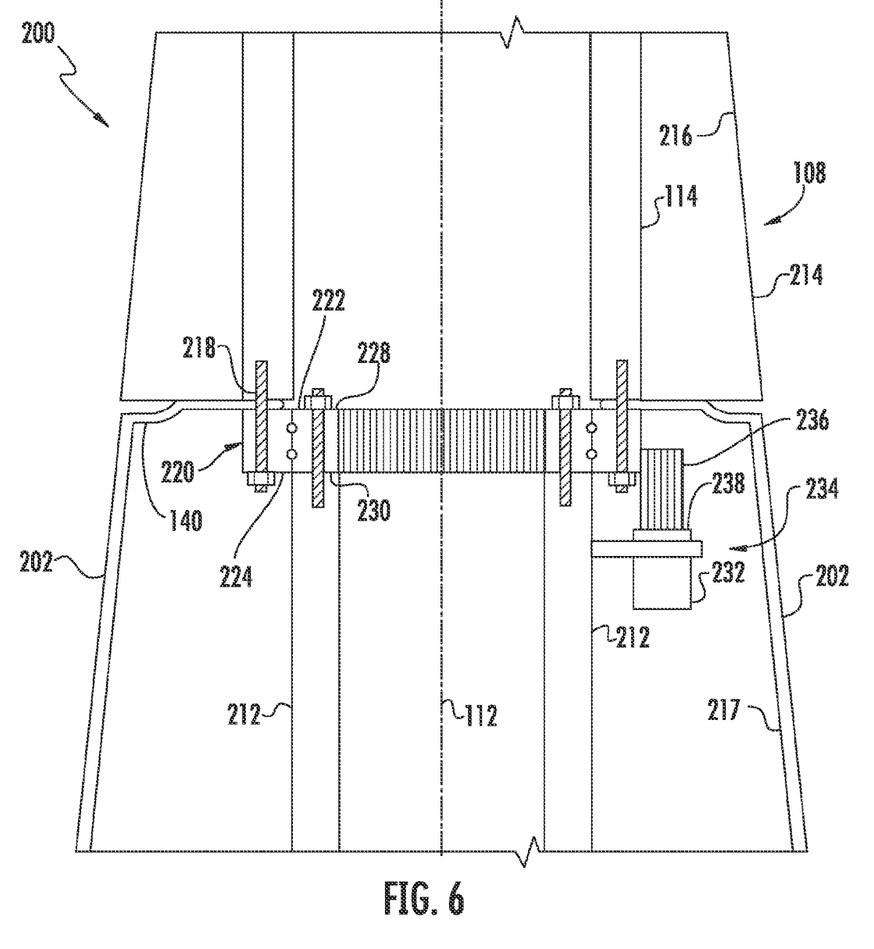
FIG. 6 illustrates another cross-sectional view of a hub assembly according to the present invention.

Referring now to FIGS. 5 and 6, one embodiment of a cross-sectional view of hub assembly 200 according to the present invention is illustrated. The illustrated embodiments of hub assembly 200 each include rotor blade 108, hub extension 212, hub airfoil section 202, blade airfoil section 214, and pitch bearing 220. As illustrated, pitch bearing 220 is coupled between hub extension 212 and rotor blade 108 at a partial span location of the effective rotor blade length. The illustrated partial span location of pitch bearing 220 (i.e. the outboard location) may decrease loads on pitch bearing 220 because shorter blades may be utilized to achieve the same effective rotor blade length. Further, pitch bearing 220 may be configured to rotate about pitch axis 112 and typically includes an inner race 222 and an outer race 224.

The embodiment of FIG. 5 illustrates one embodiment wherein blade root 114 and hub airfoil section 202 are coupled to inner race 222 of pitch bearing 220, whereas hub extension 212 is coupled to outer race 224 of pitch bearing 220. Further, blade root 114 and hub airfoil section 202 are coupled to a first side 228 of pitch bearing 220 and hub extension 212 is coupled to a second side 230 of pitch bearing 220. In this configuration, outer race 224 may remain fixed and inner race 222 may rotate about pitch axis 112 relative to outer race 224.

The embodiment of FIG. 6 illustrates another embodiment wherein blade root 114 and hub airfoil section 202 are coupled to outer race 224 of pitch bearing 220, whereas hub extension 212 is coupled to inner race 222 of pitch bearing 220. Further, blade root 114 and hub airfoil section 202 are coupled to a first side 228 of pitch bearing 220 and hub extension 212 is coupled to a second side 230 of pitch bearing 220. In this configuration, inner race 222 may remain fixed and outer race 224 may rotate about pitch axis 112 relative to outer race 224.

It should be appreciated that the rotatable hub airfoil section 202 may generally be configured to be coupled between spinner 206 and rotor blade 108 using any suitable attachment means and/or method known in the art. For example, as particularly shown in FIGS. 5 and 6, rotatable hub airfoil section 202 may include a flange 140 configured to be mounted to pitch bearing 220 using suitable mechanical fasteners 218. In the illustrated embodiment, flange 140 is generally configured to extend inwardly from surface 217 of rotatable hub airfoil section 202. However, in alternative embodiments, flange 140 may be configured as an outwardly extending flange. More specifically, as illustrated in FIG. 5, flange 140 may extend inwardly and include protrusion 128 to provide clearance for mechanical fastener 218. In another embodiment, as shown in FIG. 6, flange 140 may extend inwardly, but may be substantially flat, as additional bolt clearance is not required.

Still referring to FIGS. 5 and 6, pitch drive 234 of wind turbine 100 may be located within hub assembly 200 so as to rotate rotor blade 108 and rotatable hub airfoil section 202. For example, as illustrated in FIG. 5, pitch drive 234 may be mounted to an inner surface 216 of blade airfoil section 214 (e.g., using a bracket and/or any other suitable coupling) at any suitable location that permits pitch drive 234 to engage inner race 222 of pitch bearing 220. As such, inner race 222 may be rotated relative to outer race 224, thereby rotating rotor blade 108 and rotatable hub airfoil section 202 about common pitch axis 112.

As shown in FIG. 6, pitch drive 234 may also be located so as to engage outer race 224. As such, pitch drive 234 is similarly mounted to an inner surface 216 of blade airfoil section 214 (e.g., using a bracket and/or any other suitable coupling) at any suitable location that permits pitch drive 234 to engage outer race 224. In the illustrated embodiment, outer race 224 may be rotated relative to inner race 222, thereby rotating rotor blade 108 and rotatable hub airfoil section 202 about common pitch axis 112.

It should be readily appreciated that pitch drive 234 may generally include any suitable components and may have any suitable configuration that allows pitch drive 234 to function as described herein. For example, as shown in FIGS. 5 and 6, pitch drive 234 may include a pitch drive motor 232 (e.g., any suitable motor), a pitch drive gearbox 238, and a pitch drive pinion 236. In such an embodiment, pitch drive motor 232 may be coupled to pitch drive gearbox 238 so that pitch drive motor 232 imparts mechanical force to pitch drive gearbox 238. Similarly, pitch drive gearbox 238 may be coupled to pitch drive pinion 236 for rotation therewith. Pitch drive pinion 236 may, in turn, be in rotational engagement with inner race 222 or outer race 224 (e.g., via a gear mesh) such that rotation of pitch drive pinion 236 results in rotation of inner race 222 relative to outer race 224 or vice versa, and, thus, rotation of rotor blade 108 and rotatable hub airfoil section 202 about common pitch axis 112.

In addition, the wind turbine as described herein may include an airfoil section adapted for the nacelle so as to provide an aerodynamic profile between the hub assembly and the nacelle. For example, in one embodiment, such an airfoil section may be a stationary-mounted fairing to provide a smooth transition between a spinner that is much larger than the nacelle.

In still another embodiment, the wind turbine 100 may also include a control system 204 disposed at any location on or in the wind turbine 100 or at any location on a support surface. For example, as illustrated in FIG. 1, the control system 204 is centralized within the nacelle 102. The control system 204 may be generally configured to control the various operating modes (e.g., start-up or shut-down sequences) and/or the components of the wind turbine 100. For example, the control system 204 may be configured to transmit suitable control signals to pitch drive 234 to pitch rotor blades 108 and rotatable hub airfoil section 202.

It should be appreciated that the control system 204 may generally comprise a computer and/or any other suitable processing unit. Thus, in several embodiments, the control system 204 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the control system 204 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure control system 204 to perform various functions of wind turbine 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hub assembly for a wind turbine, said hub assembly comprising:
   at least one hub extension, said hub extension connected to and extending radially from a center of said hub assembly;
   at least one rotor blade, said rotor blade having a blade root and a blade tip, said blade root coupled to said hub extension;
   at least one rotatable hub airfoil section mounted at least partially over said hub extension so as to provide improved aerodynamic properties to said hub extension; and
   a pitch bearing coupled between said hub extension and said blade root, said pitch bearing comprising an inner race and an outer race, wherein said rotatable hub airfoil section is coupled to said pitch bearing together with said blade root so as to rotate about a common pitch axis with said rotor blade,
   wherein said blade root and said rotatable hub airfoil section are coupled together to one of said inner race or said outer race of said pitch bearing, and wherein said hub extension is coupled to another of said inner race or said outer race of said pitch bearing, the hub extension being coupled to a different race of the pitch bearing than said blade root and said rotatable hub airfoil section.

2. The hub assembly of claim 1, wherein said hub extension is coupled to said pitch bearing such that said hub extension remains fixed, and wherein said rotatable hub airfoil section and said blade root rotate together about said common pitch axis.

3. The hub assembly of claim 1, further comprising a rotatable blade airfoil section mounted at least partially over said blade root, said rotatable blade airfoil section rotatable about said common pitch axis.

4. The hub assembly of claim 1, wherein the rotatable hub airfoil section extends radially outward so as to cover at least a portion of said blade root.

5. The hub assembly of claim 1, further comprising an additional fixed hub airfoil section mounted at least partially over said hub extension, wherein said fixed hub airfoil section remains fixed relative to said blade root.

6. The hub assembly of claim 1, wherein said blade root and said rotatable hub airfoil section are coupled to said inner race of said pitch bearing, wherein said hub extension is coupled to said outer race of said pitch bearing, and wherein said inner race rotates about said common pitch axis.

7. The hub assembly of claim 1, wherein said blade root and said rotatable hub airfoil section are coupled to said outer race of said pitch bearing, wherein said hub extension is coupled to said inner race of said pitch bearing, and wherein said outer races rotates about said common pitch axis.

8. The hub assembly of claim 1, further comprising an aerodynamically-shaped spinner, wherein said spinner houses a root structure extending radially from said center of said hub assembly, and wherein said spinner is configured to be coupled to a rotor of the wind turbine.

9. The hub assembly of claim 8, wherein said rotatable hub airfoil section extends substantially from said blade root to said spinner.

10. The hub assembly of claim 1, wherein said rotatable hub airfoil section extends substantially from said blade root to said center of said hub assembly.

11. A hub assembly for a wind turbine, said hub assembly comprising:
an aerodynamically-shaped spinner, said spinner housing at least a portion of a root structure extending radially from a center of said hub assembly;
at least one hub extension extending radially from the spinner;
at least one rotor blade having a blade root and a blade tip, said blade root coupled to said hub extension; and,
at least one hub airfoil section mounted at least partially over said hub extension so as to provide improved aerodynamic properties to said hub extension; and
a pitch bearing coupled between said hub extension and said blade root, said pitch bearing comprising an inner race and an outer race, wherein said hub airfoil section is coupled to said pitch bearing together with said blade root so as to rotate about a common pitch axis with said rotor blade,
wherein said blade root and said hub airfoil section are coupled together to one of said inner race or said outer race of said pitch bearing, and wherein said hub extension is coupled to another of said inner race or said outer race of said pitch bearing, the hub extension being coupled to a different race of the pitch bearing than said blade root and said rotatable hub airfoil section.

12. The hub assembly of claim 11, further comprising a rotatable blade airfoil section mounted at least partially over said blade root, said rotatable blade airfoil section rotatable about said common pitch axis.

13. The hub assembly of claim 12, wherein said hub airfoil section is configured to rotate about said common pitch axis with said rotor blade.

14. The hub assembly of claim 11, further comprising a plurality of hub extensions and a fixed hub airfoil section, wherein said fixed hub airfoil section is fixed relative to said blade root and mounted at least partially over one of said plurality of hub extensions.

15. A wind turbine, comprising:
a tower;
a nacelle mounted on said tower;
a rotor coupled to said nacelle; and
a hub assembly coupled to said rotor, said hub assembly comprising:
at least one hub extension connected to and extending radially from a center of said hub assembly;
at least one rotor blade having a blade root and a blade tip, said blade root coupled to said hub extension;
at least one rotatable hub airfoil section mounted at least partially over said hub extension so as to provide improved aerodynamic properties to said hub extension, and
a pitch bearing coupled between said hub extension and said blade root, said pitch bearing comprising an inner race and an outer race, wherein said rotatable hub airfoil section is coupled to said pitch bearing together with said blade root so as to rotate about a common pitch axis with said rotor blade,
wherein said blade root and said rotatable hub airfoil section are coupled together to one of said inner race or said outer race of said pitch bearing, and wherein said hub extension is coupled to another of said inner race or said outer race of said pitch bearing, the hub extension being coupled to a different race of the pitch bearing than said blade root and said rotatable hub airfoil section.

16. The wind turbine of claim 15, wherein said hub assembly comprises an aerodynamically-shaped spinner, said spinner housing a root structure extending radially from said center of said hub assembly, and wherein said hub assembly is coupled to said rotor.

17. The wind turbine of claim 15, wherein said hub assembly further comprises a plurality of rotor blades having a blade root and a blade tip, a plurality of hub extensions, and a plurality of rotatable hub airfoil sections, wherein each blade root is coupled to one of said plurality of hub extensions, and wherein one of said plurality of rotatable hub airfoil sections is mounted at least partially around each hub extension.

* * * * *